T. CRANE.
Harvesting Rake.
No. 24,286. Patented June 7, 1859.
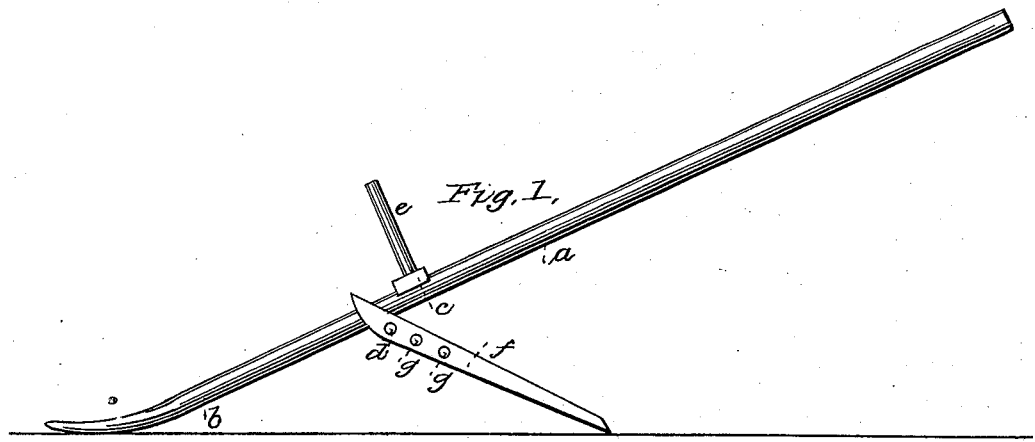
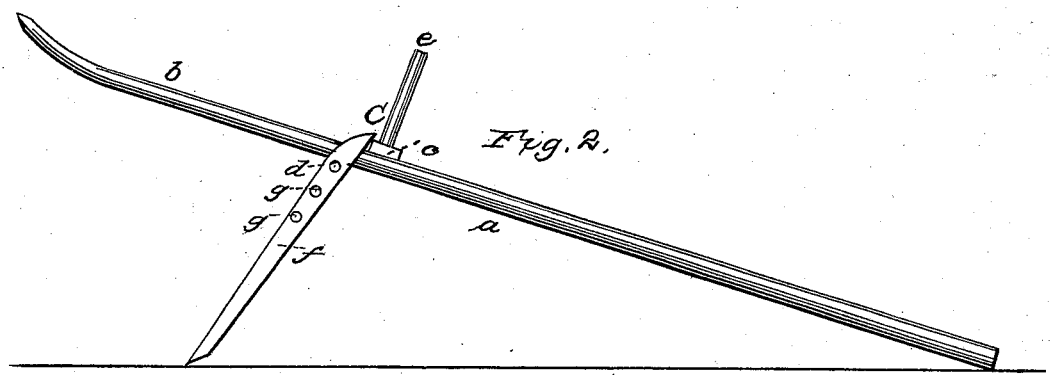
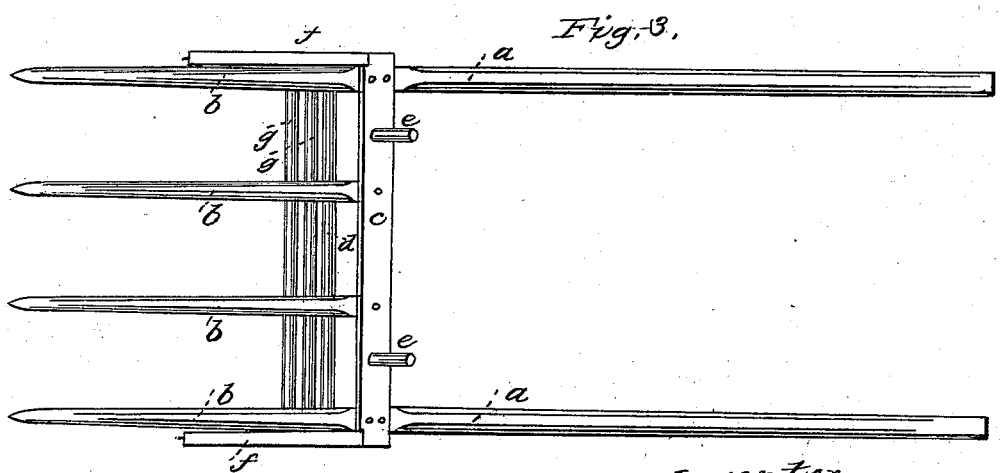
Witnesses:
Inventor
Thomas Crane

UNITED STATES PATENT OFFICE.

THOMAS CRANE, OF FORT ATKINSON, WISCONSIN.

IMPROVEMENT IN RAKES.

Specification forming part of Letters Patent No. 24,286, dated June 7, 1859.

*To all whom it may concern:*

Be it known that I, THOMAS CRANE, of Fort Atkinson, in the county of Jefferson and State of Wisconsin, have invented a new and Improved Gathering and Elevating Harvesting-Rake; and I do hereby declare that the following is a full and exact description thereof, reference being had to the accompanying drawings, which make a part of this specification.

Figures 1 and 2 are side views of my improved harvesting-rake, the former representing the position in which the rake is held by the operator when employed in gathering a sufficient quantity of cut stalks of grain for a sheaf, and Fig. 2 representing the position which the rake is thrown into preparatory to binding the said gathered stalks of grain into a sheaf. Fig. 3 is a top view of the rake when resting in the position shown in Fig. 2.

Similar letters indicate like parts in each drawing.

I generally construct my gathering and elevating harvesting-rake in such a manner as to give it four gathering-fingers, $b\ b$. The front ends of the side handles, $a\ a$, of the rake are so shaped as to form the outermost fingers of the same, and these handles are connected to each other by means of the upper cross-bar, $c$, and the under cross-bar, $d$, which are placed in the relative positions represented in the drawings, and secured in said positions by means of suitable fastenings. The intermediate fingers, $b\ b$, of the rake are secured to the said cross-bars $c\ d$ by means of suitable fastenings. The ends of the cross-bars $c\ d$ project a short distance beyond the outer sides of the handles $a\ a$, and the ends of the cross-bar $d$ are rounded off into the form of journals for the reception of the connected swinging legs $f\ f$, as shown in the drawings. The cross-bar $d$ is placed a short distance in advance of the cross-bar $c$, and the upper ends of the legs $f\ f$ rise a short distance above the upper sides of the handles $a\ a$. It will therefore be perceived that the legs can swing freely toward the rear, while they have but a limited forward movement—viz., a movement which will bring the upper extremities of said legs in contact with the projecting ends of the cross-bar $c$, as shown in Fig. 2. Therefore, when the operator is pushing forward the rake to gather up the stalks of cut grain for a sheaf he can give any degree of inclination to the handles of the rake that may suit his comfort or convenience; and as soon as he has gathered a sufficient quantity of stalks of grain for a sheaf, by simply drawing back upon the rake-handles, and at the same time depressing the after ends of said handles, he elevates the gathering-fingers and allows the rake to rest upon its legs $f\ f$ and the after ends of its handles $a\ a$ during the operation of binding the said gathered and elevated stalks of grain into a sheaf. The pins $e\ e$, which rise from the cross-bar $c$, prevent the stalks of grain from sliding inward when the rake is thrown into the position represented by Fig. 2.

The legs $f\ f$ of my improved harvesting-rake may be made of any desired length. The length of said legs should bear a suitable relation to the height of the person who is to operate it, so that in all cases the gathered stalks of grain may be elevated by the rake to the most convenient position for binding. The legs $f\ f$ are united to each other by the cross-bars $g\ g$.

What I claim as my invention, and desire to secure by Letters Patent, is—

My improved harvesting-rake for gathering and elevating cut stalks of grain preparatory to binding the same into sheaves, when the said rake is composed of side handles, gathering-fingers, and swinging legs, or the equivalents of the same, substantially as herein set forth.

The above specification of my new and improved harvesting-rake signed by me in presence of the subscribing witnesses.

THOMAS CRANE.

Witnesses:
 L. B. CASWELL,
 MARCELLUS FINCH.